No. 721,914. PATENTED MAR. 3, 1903.
I. E. PALMER.
FISH NET.
APPLICATION FILED MAR. 16, 1901.
NO MODEL. 2 SHEETS—SHEET 1.

Witnesses:
George Barry Jr.
Henry Thieme

Inventor:
Isaac E. Palmer
By Brown & Ewart
his Attorneys

No. 721,914. PATENTED MAR. 3, 1903.
I. E. PALMER.
FISH NET.
APPLICATION FILED MAR. 16, 1901.
NO MODEL. 2 SHEETS—SHEET 2.
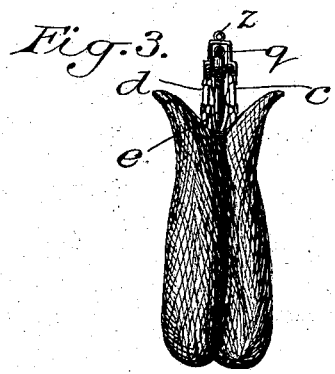
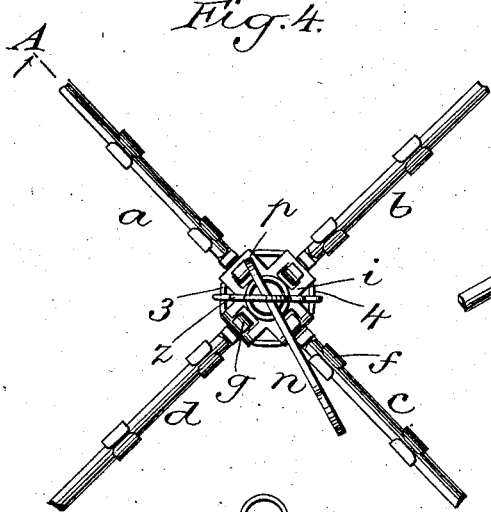
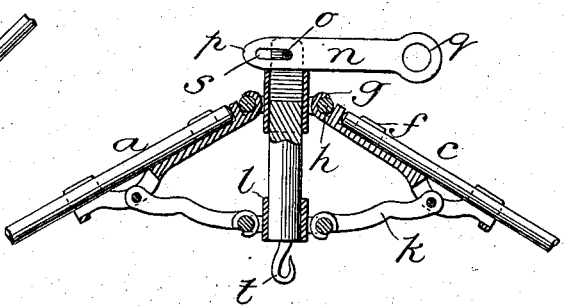
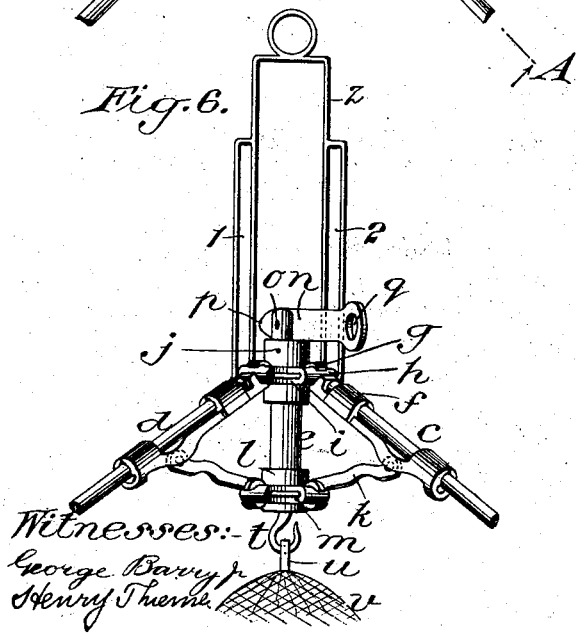
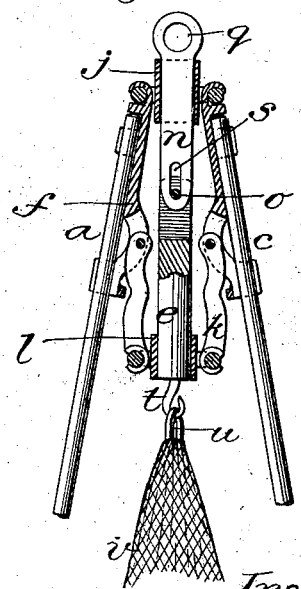
Witnesses:
George Bavy
Henry Thieme
Inventor:
Isaac E. Palmer
By Brown & Seward
his Attorneys

UNITED STATES PATENT OFFICE.

ISAAC E. PALMER, OF MIDDLETOWN, CONNECTICUT.

FISH-NET.

SPECIFICATION forming part of Letters Patent No. 721,914, dated March 3, 1903.

Application filed March 16, 1901. Serial No. 51,420. (No model.)

*To all whom it may concern:*

Be it known that I, ISAAC E. PALMER, a citizen of the United States, and a resident of Middletown, in the county of Middlesex and State of Connecticut, have invented a new and useful Fish-Net, of which the following is a specification.

My invention relates to a fish-net, and more particularly to a fish-net of the scoop or dip net type intended to lift fish which have been attracted to bait suspended over the net out of the water before they have an opportunity to escape beyond the margin of the net.

A practical embodiment of my invention is represented in the accompanying drawings, in which—

Figure 1:
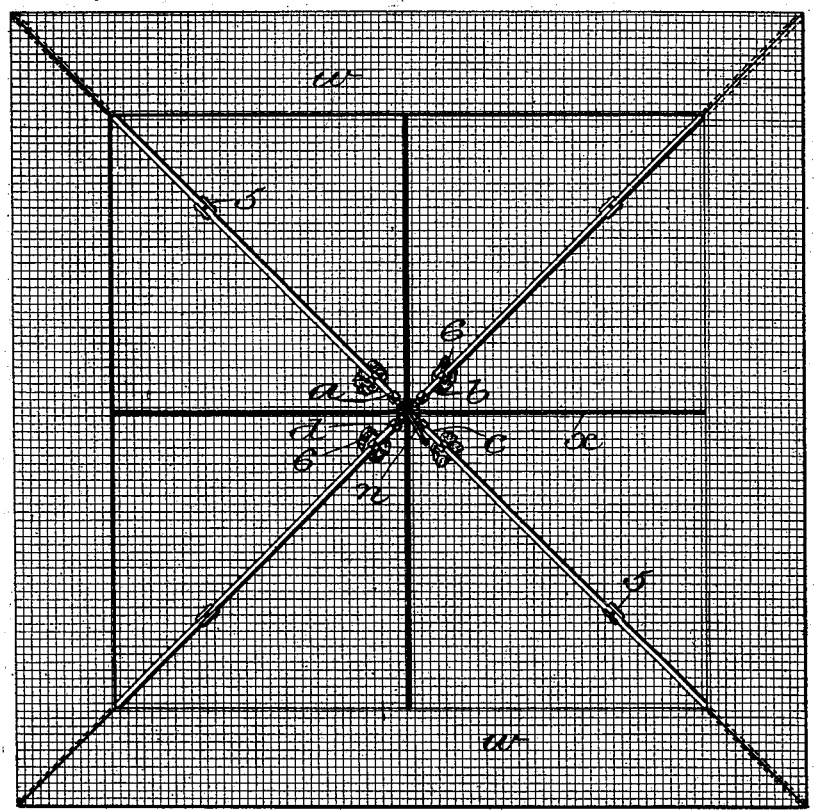
Figure 2:
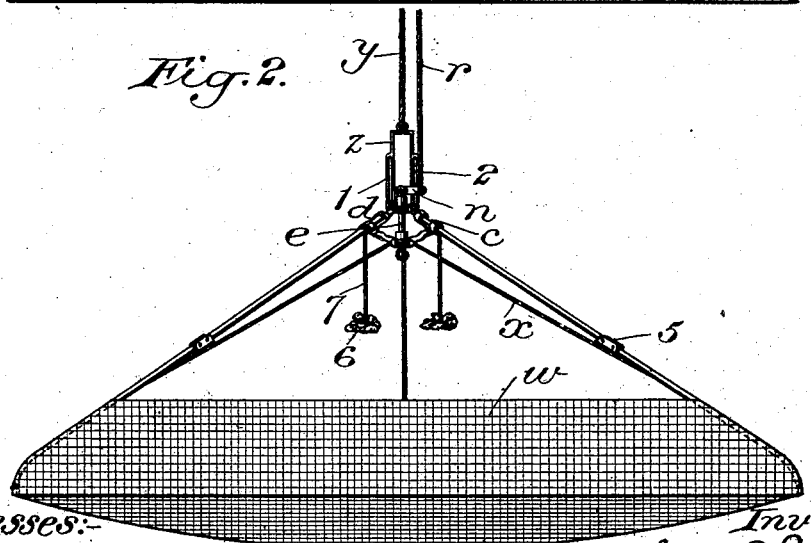

Figure 1 is a top plan view of the net when distended as in use. Fig. 2 is a view of the same in side elevation. Fig. 3 is a view of the net in its folded position for carrying or shipping. Fig. 4 is an enlarged top plan view of the folding net-frame in proximity to the center post, showing the parts in the position they assume when the net is distended. Fig. 5 is a central section of the same in the plane of the line A A of Fig. 4. Fig. 6 is a view of the same in side elevation, showing the position of the parts when the net is about to be folded; and Fig. 7 is a vertical section of the same in the plane of the line A A of Fig. 4, above referred to, showing the parts folded.

The framework of the net consists of several arms, in the present instance four, (denoted by $a\ b\ c\ d$,) located a quadrant's distance apart and diverging from a center post $e$, to which they are hinged in the following manner: The arms are each provided at their inner or upper ends with the socket or hinge piece $f$, in the present instance of skeleton form, and terminating at its upper end in a hook $g$, which embraces a pintle $h$, which forms the outer end of a perforated lug $i$, projecting laterally from a sleeve $j$, arranged to slide up and down on the post $e$. Each arm is further connected by a link $k$ with a collar $l$, fixed at the lower end of the post $e$ and provided with perforated lugs $m$, which may be, like those already described, attached to the sliding sleeve $j$, to which one end of the link $k$ is pivoted, the opposite end of the link being pivoted to the socket or hinge piece $f$, fixed to the arm. The top of the post $e$ is bifurcated to receive between its branches a tripping-lever $n$, pivotally secured in the bifurcated end of the post by means of a pin $o$, the short end $p$ of the tripping-lever $n$ being rounded or beveled for the purpose of permitting the lever to be rocked into alinement with the post, as shown in Fig. 7, while the opposite end of the tripping-lever is conveniently provided with an eye $q$ for the reception of a trip-line $r$, (see Fig. 2,) leading to the surface of the water within reach of the operator. To permit the tripping-lever to move readily from its horizontal position (shown in Fig. 6) to its vertical position, (shown in Fig. 7,) the lever is provided with an elongated slot $s$ for engaging the pivot-pin $o$. The lower end of the post $e$ is conveniently provided with a hook $t$ for the purpose of engaging a loop $u$ at the center of the bottom $v$ of the net.

The bottom of the net is held distended when in use by means of the arms $a\ b\ c\ d$, locked in their spread position by means of the trip-lever $n$, set horizontally across the sliding sleeve $j$, as shown in Fig. 6. The net may be extended upwardly from the extremities of the arms $a\ b\ c\ d$, forming side portions $w$ when desired, to form more of a pocket than the bottom alone would naturally form, and in addition to the arms $a\ b\ c\ d$ the net may be further held in position by means of cords $x$, leading from the post $e$—as, for example, from the collar $l$ to the middle portions of the upper edges of the sides of the net.

The lifting-iron $y$ is attached to the net by means of a vertically-sliding loop $z$, having elongated slots 1 and 2 formed at its opposite edges, arranged to embrace suspension-bars 3 and 4, extending between the lugs on the sliding sleeve $j$. The suspension-bars 3 and 4 may be conveniently formed by extending a wire through the perforated lugs, as clearly shown in Fig. 4, the said wire bridging the spaces between the lugs and forming the suspension-bars. This structure permits the suspension-loop $z$ to be slid downwardly until its top is in proximity to the top of the post when the net is not in use and when in use permits it to be drawn up out of the way of the trip-lever $n$.

As thus far described the parts may be folded as indicated in Fig. 7; but for purposes of making a more compact bundle of the whole the arms *a b c d* may be jointed, as shown at 5, Fig. 2, permitting the lower portion to fold outwardly and over against the upper portion into the position shown in Fig. 3.

In operation the net may be lowered either directly from the hand of the operator sitting in a boat or support overhanging the water or it may be attached to the end of a pole with the trip-line leading from the end of the pole back to the hand of the operator.

The position of the net when lowered in position as in use is represented in Figs. 1 and 2, the bait (denoted by 6) being suspended by short cords or wires 7 over the middle portion of the bottom of the net.

When the fish has been attracted by the bait and has come into a position in proximity to the bait, the net may be quickly lifted, and at the same moment or within a moment after it has begun to rise it may be tripped, collapsing it into a closed pocket. The first movement of the fish when the net is lifted is usually downward toward the bottom, and at about the time the fish strikes the bottom of the net the pull on the trip-line will throw the trip-lever *n* into position shown in Fig. 7, permitting the sleeve *j* to slide up into the position shown in Fig. 7, causing the arms *a b c d* to approach the piece *e*, thereby pocketing the fish and permitting the net to be readily hauled to the surface for the purpose of removing the fish and again setting it for further action.

It is evident that changes might be resorted to in the form and arrangement of the several parts without departing from the spirit and scope of my invention. Hence I do not wish to limit myself strictly to the structure herein set forth; but

What I claim is—

1. A dip or scoop net comprising a central vertically-movable piece, arms hinged to and radiating from the said central piece with their outer ends arranged to swing inwardly below the center piece as the center piece is raised, a net secured to the arms to be distended thereby, a device for holding the center piece depressed and thereby holding the arms distended, means for supporting the net as a whole and means for tripping the arm-holding device to permit the center piece to rise and arms to fold.

2. A dip or scoop net comprising a center post, a sliding sleeve mounted on said post, arms hinged to said sliding sleeve and arranged to swing inwardly below the sleeve as the sleeve is raised, a trip-lever for locking and releasing the sleeve, a net secured to the arms, a suspension device leading from the center post and means for operating the trip-lever.

3. A dip or scoop net comprising a center post, a sliding sleeve mounted on the center post, arms hinged to the sliding sleeve, pivoted links connecting the arms with the center post and a trip-lever pivoted to the center post and adapted to swing out of and into alinement with the said post to lock and release the sliding sleeve, a net attached to the folding arms, means for operating the trip-lever and means for suspending the net as a whole, substantially as set forth.

4. A dip or scoop net comprising a center post, a sliding sleeve mounted thereon, arms hinged to the sliding sleeve, pivoted links connecting the post and arms, a trip-lever pivotally secured to the center post and having a limited movement bodily relative to the post, a net attached to the arms and means for suspending the net, substantially as set forth.

5. A dip or scoop net comprising jointed arms radiating from a center piece and arranged to fold as a whole and in sections, the arms as a whole being arranged to fold inwardly below the center piece and the outer sections of the arms being arranged to fold upwardly over against the inner sections of the arms, a net attached to the arms in position to be distended thereby and means for locking and releasing the arms to hold the net distended or permit it to collapse.

In testimony that I claim the foregoing as my invention I have signed my name, in presence of two witnesses, this 5th day of March, 1901.

ISAAC E. PALMER.

Witnesses:
CHAS. M. SAUER,
PAUL S. CARRIER.